United States Patent [19]

Takezawa et al.

[11] Patent Number: 5,512,119
[45] Date of Patent: Apr. 30, 1996

[54] METHOD OF MAKING A HYBRID PREPREG

[75] Inventors: Makoto Takezawa; Makiji Miyao; Sadahisa Wada; Hiroshi Inoue, all of Oi, Japan

[73] Assignee: Tonen Corporation, Tokyo, Japan

[21] Appl. No.: 127,928

[22] Filed: Sep. 27, 1993

Related U.S. Application Data

[62] Division of Ser. No. 634,839, Dec. 27, 1990, Pat. No. 5,279,879.

[30] Foreign Application Priority Data

| Dec. 28, 1989 | [JP] | Japan | 1-342441 |
| Dec. 29, 1989 | [JP] | Japan | 1-340586 |
| Dec. 29, 1989 | [JP] | Japan | 1-340587 |
| Dec. 29, 1989 | [JP] | Japan | 1-340588 |
| Jan. 26, 1990 | [JP] | Japan | 2-16706 |
| Jan. 26, 1990 | [JP] | Japan | 2-16707 |
| Jan. 26, 1990 | [JP] | Japan | 2-16708 |
| Feb. 23, 1990 | [JP] | Japan | 2-43743 |
| Feb. 23, 1990 | [JP] | Japan | 2-43744 |
| Feb. 23, 1990 | [JP] | Japan | 2-43745 |

[51] Int. Cl.⁶ .......................... B32B 29/02; B65H 81/00
[52] U.S. Cl. .......................... 156/171; 156/174; 156/177; 156/179; 156/190; 156/191; 156/193
[58] Field of Search .................... 156/166, 169, 156/170, 171, 174, 175, 184, 188, 190, 177, 179, 192, 193

[56] References Cited

U.S. PATENT DOCUMENTS

| 2,758,951 | 8/1956 | Case. |
| 3,713,946 | 1/1973 | Molyneux. |
| 3,755,061 | 8/1973 | Schurb. |
| 3,847,707 | 11/1974 | Meyer et al.. |
| 3,898,113 | 8/1975 | Meyer et al.. |
| 3,953,637 | 4/1976 | Phillips. |
| 4,003,778 | 1/1977 | Phillips. |
| 4,532,169 | 7/1985 | Carley ........................ 156/161 |
| 4,568,245 | 2/1986 | Hibyan et al.. |
| 4,886,684 | 12/1989 | Schnell et al.. |
| 4,943,472 | 7/1990 | Dyksterhouse et al.. |
| 4,946,538 | 8/1990 | Bendarzewski et al. ............ 156/361 |
| 5,116,668 | 5/1992 | Yamamoto et al.. |
| 5,137,766 | 8/1992 | Mazanek et al.. |

FOREIGN PATENT DOCUMENTS

| 0303098 | 2/1989 | European Pat. Off.. |
| 2198822 | 4/1974 | France. |
| 2021347 | 11/1970 | Germany. |
| 1304015 | 1/1973 | United Kingdom. |

OTHER PUBLICATIONS

*Patent Abstracts of Japan,* vol. 12, No. 296 (M–731) (3143) 12 Aug. 1988 & JP 63 074 606, 5 Apr. 1988.

*Primary Examiner*—James D. Withers
*Attorney, Agent, or Firm*—Seidel, Gonda, Lavorgna & Monaco

[57] ABSTRACT

The present invention relates to a hybrid prepreg having reinforcing carbon fibers and foreign fibers. The carbon fibers have a diameter ranging from 5–30 microns and are unidirectionally arranged. The foreign fibers are composed either of single monofilaments having a diameter ranging from between about 50–150 microns or of strands formed by bundling together a plurality of single monofilaments having a diameter ranging from between about 5–50 microns. If strands are employed, they have a conversion diameter ($D_0$) which is less than about 500 microns. The conversion diameter ($D_0$) is represented by the following equation:

$$D_0 = \sqrt{n} \cdot d$$

wherein n is the number of monofilaments used in forming the strand, and wherein d is the diameter of these monofilaments. Examples of foreign fibers which can be used when practicing this invention include boron fibers, metal fibers and organic fibers. These foreign fibers are spaced at fixed intervals, arranged in the same direction as the direction of the reinforcing carbon fibers, and positioned approximately at or near the center of the resulting prepreg. The prepreg prepared in accordance with the present invention also includes a thermosetting matrix resin in which the reinforcing carbon fibers and the foreign fibers are impregnated.

8 Claims, 11 Drawing Sheets

METHOD OF MAKING A HYBRID PREPREG

This is a divisional of application Ser. No. 07/634,839, filed on Dec. 27, 1990, now U.S. Pat. No. 5,279,879.

APPLICABLE INDUSTRIAL FIELD

The present invention relates to a hybrid prepreg having reinforcing fibers such as carbon fibers each having a small diameter, and reinforcing fibers such as foreign fibers each having a diameter (including a "conversion diameter" which will be described later) which differs from the diameter of the carbon fiber and which is larger than the diameter of the carbon fiber. These foreign fibers include, for example, metal fibers such as titanium fibers, amorphous fibers and stainless steel fibers; inorganic fibers such as boron fibers and glass fibers; or various organic fibers. This invention also relates to a manufacturing method for such hybrid prepregs.

CONVENTIONAL ART

Prepregs using reinforcing fibers like carbon fibers and different other fibers have been widely used in recent years in various technical fields. For example, such prepregs have been widely used to manufacture golf shafts, fishing rods and racket frames such as tennis rackets and badminton rackets with good results, because these products exhibit light weight and excellent mechanical strength.

However, there arises a further desire to improve such prepregs in strength and in elasticity modulus and the feel in using the products manufactured by using the prepregs. In order to meet the above-described desire, there has been proposed a method of use in which foreign fibers are interposed, as reinforcing fibers, between the prepregs, said foreign fibers including, for example, boron fibers, titanium fibers, amorphous fibers, stainless steel fibers, glass fibers, various organic fibers, etc. which differ from the reinforcing fibers of the prepregs. Research on such a method has been actively conducted.

In order to satisfy the above requirements, the hybrid prepreg constructed as shown in FIG. 8 has been proposed and is presently being used.

In other words, this hybrid prepreg in FIG. 8 is formed in such a manner that foreign fibers 6, which are different from reinforcing fibers 2, are arranged at equal intervals on a prepreg 4 using the reinforcing fibers 2 such as carbon fibers.

Such a hybrid prepreg can be easily manufactured. Improvements in the mechanical strength of the products manufactured by the hybrid prepreg and the feel in using the same can be made. However, there is a problem in that the prepreg 4 and the foreign fibers 6 are not sufficiently joined together to obtain desired mechanical strength. Furthermore, since the diameter of the foreign fiber 6 such as a boron fiber, a titanium fiber, an amorphous fiber and a stainless steel fiber, is large, the thickness of the hybrid prepreg consequently becomes large. Thus it is difficult to provide thin hybrid prepregs.

Accordingly, an object of the present invention is to provide a hybrid prepreg which can provide a thin prepreg and in which properties such as mechanical strength are improved as compared with the conventional hybrid prepreg, and further, to provide a manufacturing method for this hybrid prepreg. Reinforced fibers, each having a small diameter, and foreign fibers, each having a large diameter, are used in this hybrid prepreg.

Furthermore, as will be described in detail later, another object of this invention is to provide a manufacturing method for hybrid prepregs whose mechanical properties are good, whose appearance is appealing, and in which reinforce fibers and foreign fibers are both so arranged as not to be twisted in the longitudinal direction of the respective fibers.

BRIEF DESCRIPTION OF THE INVENTION

The above objects can be achieved by a hybrid prepreg and a manufacturing method for this hybrid prepreg in accordance with the present invention. In brief, this invention is a hybrid prepreg wherein foreign fibers each having a diameter of 50–500 μm are arranged in reinforcing fibers each having a diameter of 5–30 μm, at fixed intervals and in the same direction as that of said reinforcing fibers.

In accordance with the first embodiment of the present invention the reinforcing fiber is one or a plurality of fibers selected from an inorganic fiber such as a carbon fiber, a boron fiber with a small fiber diameter, a glass fiber, a alumina fiber, a silicon carbide fiber and a silicon nitride fiber; an organic fiber such as an aramid fiber, a polyarylate fiber, and a polyethylene fiber; and a metal fiber such as a titanium fiber with a small fiber diameter, an amorphous fiber and a stainless steel fiber, and the foreign fiber is one or a plurality of fibers selected from an inorganic fiber such as a boron fiber with a larger fiber diameter compared with the reinforcing fiber, a glass fiber, an alumina fiber, a silicon carbide fiber and a silicon nitride fiber; an organic fiber such as an aramid fiber, a polyarylate fiber and a polyethylene fiber; and a metal fiber Such as a titanium fiber, an amorphous fiber and a stainless steel fiber.

In accordance with the second embodiment of the present invention the reinforcing fibers are carbon fibers, and the foreign fibers are composed of boron fibers and one or a plurality of different fibers which are different from the boron fibers and the carbon fibers. The different fiber is selected from an inorganic fiber such as a glass fiber, an alumina fiber, a silicon carbide fiber and a silicon nitride fiber; an organic fiber such as an aramid fiber, a polyarylate fiber and a polyethylene fiber; and a metal fiber such as a titanium fiber, an amorphous fiber and a stainless steel fiber.

In accordance with the third embodiment of the present invention the reinforcing fibers are carbon fibers, and the foreign fibers are composed of metal fibers and one or a plurality of different fibers which are different from the metal fibers and the carbon fibers.

The metal fiber is selected from a titanium fiber, an amorphous fiber and a stainless steel fiber, and the different fiber is selected from an inorganic fiber such as a boron fiber with a large fiber diameter, a glass fiber, an alumina fiber, a silicon carbide fiber and a silicon nitride fiber; and an organic fiber such as an aramid fiber, a polyarylate fiber and a polyethylene fiber.

In accordance with the fourth embodiment of the present invention the reinforcing fibers are carbon fibers, and the foreign fibers are composed of organic fibers and different fibers which are glass fibers and/or inorganic fibers. The organic fiber is selected from an aramid fiber, a polyarylate fiber and a polyethylene fiber, and the different fiber is one or a plurality of fibers selected from a boron fiber with a large fiber diameter, an alumina fiber, a silicon carbide fiber and a silicon nitride fiber.

In accordance with the fifth embodiment of the present invention the reinforcing fibers are composed of carbon fibers arranged on one side of the prepreg and in one direction, and glass fibers arranged on the other side of the prepreg and in the same direction as the direction of the carbon fiber, and the foreign fibers are composed of boron fibers and one or a plurality of different fibers which are different from the boron fibers, the carbon fibers and the glass fibers. The different fiber is selected from an inorganic fiber such as an alumina fiber, a silicon carbide fiber and a silicon nitride fiber; an organic fiber such as an aramid fiber, a polyarylate fiber and a polyethylene fiber; and a metal fiber such as a titanium fiber, an amorphous fiber and a stainless steel fiber.

In accordance with the sixth embodiment of the present invention the reinforcing fibers are composed of carbon fibers arranged on one side of the prepreg and in one direction, and glass fibers arranged on the other side of the prepreg and in the same direction as the direction of the carbon fibers, and the foreign fibers are composed of metal fibers and one or a plurality of different fibers which are different from the metal fibers, the carbon fibers and the glass fibers. The metal fiber is selected from a titanium fiber, an amorphous fiber and an stainless steel fiber, and the different fiber is selected from an inorganic fiber such as a boron fiber with a large fiber diameter, an alumina fiber, a silicon carbide fiber and a silicon nitride fiber; and an organic fiber such as an aramid fiber, a polyarylate fiber and a polyethylene fiber.

In accordance with the seventh embodiment of the present invention the reinforcing fibers are composed of carbon fibers arranged on one side of the prepreg and in one direction, and glass fibers arranged on the other side of the prepreg and in the same direction as the direction of the carbon fibers, and the foreign fibers are composed of organic fibers and different fibers which is inorganic fibers but glass fibers. The organic fiber is selected from an aramid fiber, a polyarylate fiber and a polyethylene fiber, and the different fiber is one or a plurality of fibers selected from a boron fiber with a large fiber diameter, an alumina fiber, a silicon Carbide fiber and a silicon nitride fiber.

Such hybrid prepregs according to the present invention may be preferably manufactured by a manufacturing method which comprises preparing two sheets of unidirectional fiber reinforced prepregs which use reinforcing fibers each having a fiber diameter of 5–30 μm, and sandwiching between the prepregs foreign fibers each having a fiber diameter of 50–500 μm which are arranged at fixed intervals and in the same direction as the direction of the reinforcing fibers in the prepregs so as to be integrally formed. Particularly, the method may be effectively realized by using a drum winder. Namely, the hybrid prepreg may be preferably manufactured by a manufacturing method which comprises the steps of (a) winding a unidirectional fiber reinforced prepreg, in which reinforcing fibers each having a diameter of 5–30 μm are used, around the periphery of a drum having a fixed diameter so that the arrangement direction of the reinforcing fibers are oriented in the circumferential direction of the drum; (b) winding, at a regular pitch, foreign fibers each having a diameter of 50–500 μm which differs from the diameter of the reinforcing fiber of said prepreg, around the periphery of the unidirectional fiber reinforced prepreg which has already been wound around said drum; and (c) while the prepreg is wound around said drum or after the prepreg is drawn from said drum, laying, further, another unidirectional fiber reinforced prepreg, in which reinforcing fibers each having a diameter of 5–30 μm are used, over the surface of the unidirectional fiber reinforced prepreg in which said foreign fibers are so arranged that the arrangement direction of the reinforcing fibers is oriented in the circumferential direction of the drum.

Further, in accordance with another manufacturing method of the present invention an elongated hybrid prepreg having a construction according to the above-described present invention may be easily produced.

Namely, a method of manufacturing an elongated hybrid prepreg according to the present invention in which foreign fibers each having a fiber diameter of 50–500 μm are disposed in reinforcing fibers each having a fiber diameter of 5–30 μm at fixed intervals and in the same direction as the direction of the reinforcing fibers, said method comprising (a) successibly supplying the foreign fibers while arranging the fibers at predetermined intervals; (b) successively supplying, along the foreign fibers, a first and second fiber reinforced prepregs with the reinforcing fibers, each of which is held by a release paper, in such a manner that the foreign fibers are sandwiched between the prepregs; and (c) pressing the first fiber reinforced prepreg with the release paper, the foreign fibers, and the second fiber reinforced prepreg with the release paper to the thickness which is 0.7 to 0.8 times the total thickness of said first and second fiber reinforced prepregs with the release papers and heating the same to a degree at which the viscosity of a matrix resin in the first and second fiber reinforced prepregs becomes 1000 to 50000 cp. Furthermore, according to another aspect to the present invention there is provided a method of manufacturing an elongated hybrid prepreg in which foreign fibers each having a fiber diameter of 50–500 μm are disposed in reinforcing fibers each having a fiber diameter of 5–30 μm at fixed intervals and in the same direction as the direction of the reinforcing fibers, said method comprising (a) successively supplying the foreign fibers while arranging them at predetermined intervals; (b) successively supplying the reinforcing fibers opened by opening means from two sides of the foreign fibers along the foreign fibers; (c) successively supplying first and second resin coated paper along the foreign fibers and the reinforcing fibers while holding the foreign fibers and the reinforcing fibers; (d) integrally forming, by pressure and heat, the first resin coated paper, the foreign fibers, the reinforcing fibers and the second resin coated paper so as to cause a matrix resin in the first and second resin coated papers to be impregnated into the foreign fibers and the reinforcing fibers.

PREFERRED EMBODIMENTS OF THE INVENTION

A hybrid prepreg and a manufacturing method for this hybrid prepreg in accordance with the present invention will now be described in detail with reference to the drawings.

Embodiment 1

Figure 1:
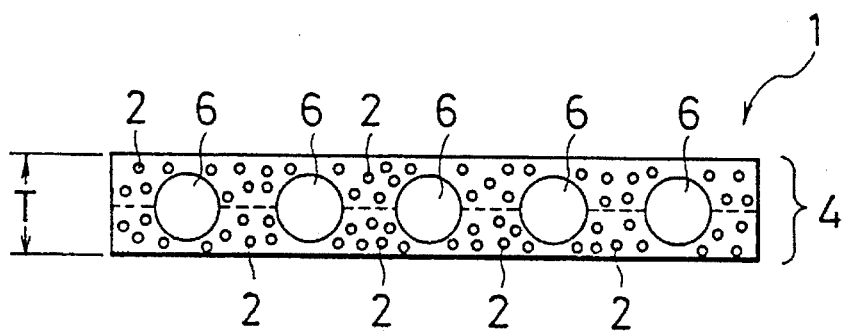
FIGS. 1 and 2 are cross-sectional views in which the structure of the hybrid prepreg in accordance with the present invention is shown.
Figure 2:
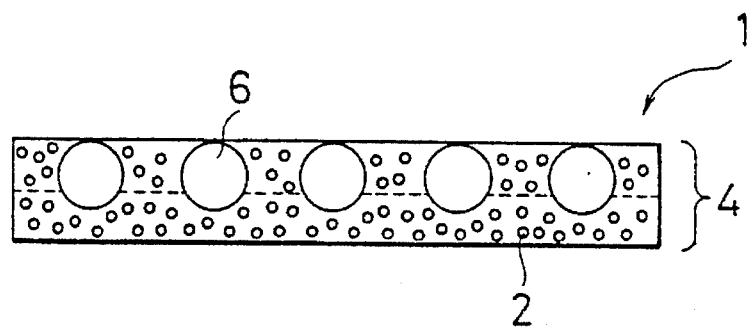

FIG. 1 shows the first embodiment of the hybrid prepreg 1 in accordance with this invention. According to this embodiment, the hybrid prepreg 1 is constructed in such a manner that foreign fibers 6, each having a diameter of 50–500 μm, are arranged inside a prepreg 4 which has carbon fibers, used as reinforcing fibers 2, each having a diameter of 5–30 μm. The foreign fibers 6 are spaced at fixed intervals, and are arranged in the same direction in which the carbon fibers are arranged. While this arrangement is made, as shown in FIG. 1, it is desirable that the foreign fibers 6 be positioned at the center of the unidirectional carbon fiber prepreg 4. As shown in FIG. 2, however, even when the foreign fibers 6 are positioned deviating slightly from the center of the prepreg 4, operational effects are equally obtained.

The hybrid prepreg 1 having such a construction can be manufactured by various methods. It is preferably manufactured in such a way that the foreign fibers 6 are interposed between the two unidirectional carbon fiber reinforced prepregs 4 in which the carbon fibers are especially used as reinforcing fibers 2. The foreign fibers 6 are spaced at fixed intervals and are arranged in the same direction in which the carbon fibers are arranged. The unidirectional carbon fiber reinforced prepreg 4 is then pressed and/or heated to form an integral structure.

Figure 3:
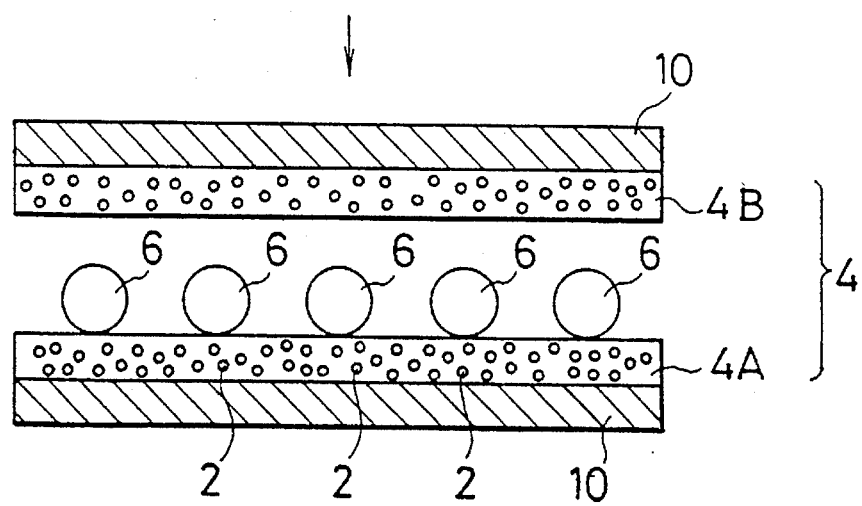
FIG. 3 is a cross-sectional view explaining a manufacturing method for the hybrid prepreg in accordance with this invention.

The above preferable method will be further explained. As shown in FIG. 3, the foreign fibers 6 are disposed on a first carbon fiber reinforced prepreg 4A which is retained by a sheet of release paper 10. The first carbon fiber reinforced prepreg 4A has carbon fibers, used as reinforcing fibers 2, each having a diameter of 5–30 μm. The foreign fibers 6 each have a diameter of 50–500 μm which is larger than the diameter of each of the reinforcing fibers 2, are arranged in the same direction as that of the reinforcing fibers 2 arranged in the first carbon fiber reinforced prepreg 4A. A second carbon fiber reinforced prepreg 4B, retained by the same release paper 10 as that used for the first carbon fiber reinforced prepreg 4A, is laid over the foreign fibers 6 so as to be sandwiched between the first and second carbon fiber reinforced prepregs 4A, 4B. The first and second carbon fiber reinforced prepregs 4A, 4B are then pressed against each other and/or heated. The first carbon fiber reinforced prepreg 4A, the foreign fiber 6, and the second carbon fiber reinforced prepreg 4B are thus integrally joined together. The hybrid prepreg 1, as shown in FIG. 1 or 2, in accordance with the present invention is thus formed.

The same carbon fibers which are used as reinforcing fibers 2 may be used in the first and second carbon fiber reinforced prepregs 4A, 4B. Carbon fibers with different strength may also be used.

Furthermore, different types of reinforcing fibers may also be used in the prepregs 4A and 4B.

Thus, the reinforced fiber 2 is not limited to a carbon fiber. Other than a carbon fiber, an inorganic fiber such as a boron fiber with a small diameter, a glass fiber, an alumina fiber, a silicon carbide fiber and a silicon nitride fiber may be used. An organic fiber such as an aramid fiber, a polyarylate fiber and a polyethylene fiber may also be used, or a metal fiber having a small diameter such as a titanium fiber, an amorphous fiber and a stainless steel fiber may also be used. These fibers can be used arbitrarily. The diameter of the reinforced fiber 2 is 5–30 μm, and preferably 6–12 μm.

An inorganic fiber such as a boron fiber having a diameter larger than that of the reinforcing fiber 2 may be preferably used as the foreign fiber 6. A metal fiber such as a titanium fiber, an amorphous fiber and a stainless steel fiber, may also be preferably used as the foreign fiber 6. The diameter of such a foreign fiber is 50–150 μm, and preferably 70–120 μm.

Figure 4:
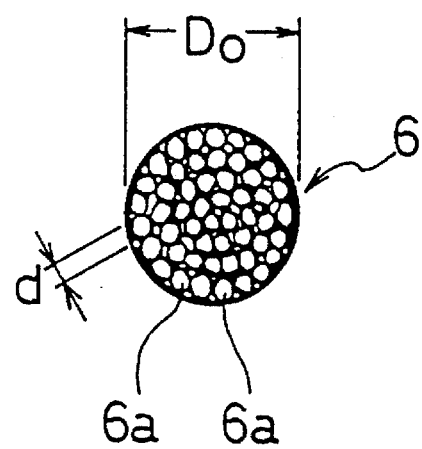
FIG. 4 is a cross-sectional view of a strand in which one form of a foreign fiber is shown, this foreign fiber being used in the present invention.

Furthermore, in accordance with the present invention, an inorganic fiber such as a glass fiber, an alumina fiber, a silicon carbide fiber and a silicon nitride fiber may also be used as the foreign fiber 6. Even an organic fiber such as an aramid fiber, a polyarylate fiber and a polyethylene fiber may also be used. However, the diameter or monofilament diameter (d), of each of these fibers is as small as 5–50 μm. Therefore, when a fiber having such a small diameter is used as the foreign fiber 6, as shown in FIG. 4, it is used in the form of a strand (fiber tow) in which many fibers 6a are bundled.

Thus, even a metal fiber having a small diameter can be used in the form of a strand.

In this specification, a "conversion diameter" $D_o$ represented in the following equation indicates the diameter of the foreign fiber 6 in the form of a strand.

$$D_0 = \sqrt{n} \cdot d$$

where n is the number of fibers bundled, and d is the diameter of the foreign fiber.

Figure 5:
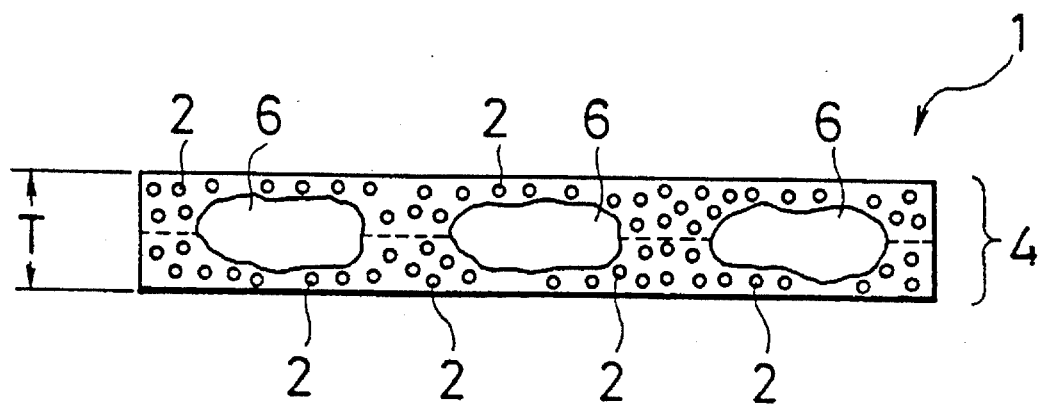
FIG. 5 is a cross-sectional view of another embodiment in which the structure of hybrid prepreg in accordance with this invention is shown.

Furthermore, in the case where the foreign fiber 6 is used in the form of such a strand, as shown in FIG. 5, whether it is twisted or not, the foreign fiber 6 is present inside the hybrid prepreg 1, not in the shape of a circle with the conversion diameter Do in cross section, but in a somewhat flattened shape. Therefore, when the hybrid prepreg 1 having the same thickness (T), which is the same as that of a hybrid prepreg in which a fiber such as a boron fiber with a large diameter, a titanium fiber, an amorphous fiber and a stainless steel fiber is used as the foreign fiber 6, as mentioned above, is manufactured, the diameter of the foreign fiber 6 in the form of a strand or the conversion diameter $D_o$, preferably becomes 500 μm at most.

For example, as regards an organic fiber such as a polyarylate fiber having a diameter "d" of 23 μm, when 300 fibers are bundled, the conversion diameter $D_o$ is 398 μm. Furthermore, as regards a glass fiber having a diameter "d" of 13 μm, when 800 fibers are bundled, the conversion diameter D is 368 μm. Both of these fibers are preferably used as the foreign fiber 6 in the form of a strand, whereby the hybrid prepreg 1 as shown in FIG. 5 can be manufactured.

As the matrix resin, a thermosetting matrix resin such as an epoxy resin, an unsaturated polyester resin, a polyurethane resin, a diallyl phthalate resin, and a phenolic resin may be employed. Moreover, a curing agent and an additive such as a flexibilizer can be appropriately added so that the curing temperature ranges from 50° to 200° C.

As regards the epoxy resin, it is preferable that one or several of the following epoxy resins be selected for use as the matrix resin: for example, (1) a glycidyl ether epoxy resin (bisphenol A, F, S epoxy resin, novolac epoxy resin and brominated bisphenol A epoxy resin); (2) a cyclic aliphatic epoxy resin; (3) a glycidyl ester epoxy resin; (4) a glycidyl amine epoxy resin; (5) a heterocyclic epoxy resin; and various other epoxy resins. Bisphenol A, F, S glycidyl amine epoxy resin is preferably used. As the curing agent, an amine curing agent such as dicyandiamide (DICY), diaminophenylsulfone (DDS) and diaminodiphenylmethane (DDM); and an acidic anhydride such as hexahydrophthalic anhidride (HHPA) and methylhexahydrophthalic anhydride (MHHPA) is employed. In particular the amine curing agent is preferably used. The hybrid prepreg according to the present invention may be composed of the reinforcing fiber, the foreign fiber and the matrix resin at a desired mixture ratio. Generally, it is arranged, by weight %, in such a manner that reinforcing fiber: foreign fiber: matrix resin is (40 to 80): (2 to 20): (20 to 60). Furthermore, in accordance with this invention, the thickness (T) of the prepreg becomes approximately as thick as the diameter of the foreign fiber to be used, and is generally about 80–200 μm.

Figure 6:
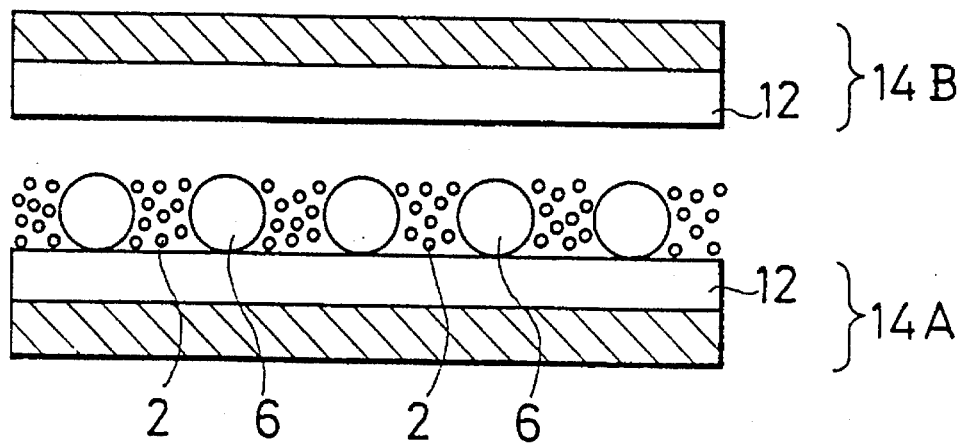
FIG. 6 is a cross-sectional view explaining another manufacturing method for the hybrid prepreg in accordance with this invention.

In addition, the hybrid prepreg in accordance with the present invention can also be manufactured by the method shown in FIG. 6. In other words, the reinforcing fibers 2 and the foreign fibers 6 are arranged at fixed intervals on a first sheet of coated paper 14A in which a matrix resin 12 is applied to a release paper. A second sheet of coated paper 14B in which the matrix resin 12 is also applied to a release paper is then laid over the reinforcing fibers 2 and the foreign fibers 6 so as to cover the first resin coated paper 14A. The hybrid prepreg 1 in accordance with this invention, as shown in FIG. 1, is manufactured by pressing and heating both sheets of the resin coated paper.

The hybrid prepreg and a manufacturing method for this hybrid prepreg according to the present invention will now be described more specifically. In this embodiment, a preferable manufacturing method using a drum winder will be explained.

Figure 7:
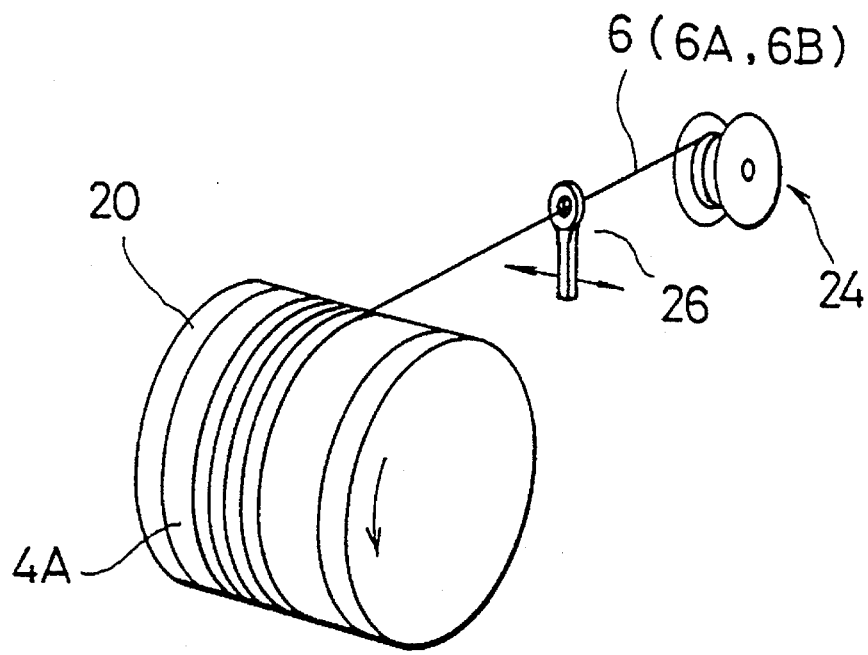
FIG. 7 is a perspective view explaining a preferred manufacturing method for the hybrid prepreg according to this invention.

As shown in FIG. 7, the unidirectional carbon fiber reinforced prepreg 4A is wound around the periphery of a drum 20 having a fixed diameter. This unidirectional carbon fiber reinforced prepreg 4A in which, for example, carbon fiber is used as the reinforcing fiber, is retained on the release paper 10. During the above winding, the carbon fiber 2 is arranged in a direction so as to be oriented in the circumferential direction of the drum 20. The foreign fiber 6 is then fed through a traverse device 26 from a bobbin 24 to the drum 20, thereby being wound on the drum 20 at a regular pitch, that is, on the carbon fiber reinforced prepreg 4A which has already been wound around the drum 20.

Then, as shown FIG. 3, the second unidirectional carbon fiber reinforced prepreg 4B is laid over the surface of the drum 20 so as to cover the surface of the unidirectional carbon fiber reinforced prepreg 4A in which the foreign fibers 6 are arranged. The second unidirectional carbon fiber reinforced prepreg 4B, retained by the release paper 10, is laid over the surface of the drum 20 so that the fiber direction of the unidirectional carbon fiber reinforced prepreg 4B is oriented in the circumferential direction of the drum 20. When the foreign fibers 6 are sandwiched between the first and second carbon fiber reinforced prepregs 4A, 4B, the first and second unidirectional carbon fiber reinforced prepregs 4A, 4B are joined together to form an integral structure. The hybrid prepreg in accordance with the present invention is thus formed, this hybrid prepreg having the cross sectional shape shown in FIG. 1.

In another manufacturing method for a prepreg, the second carbon fiber reinforced prepreg 4B is laid over the first carbon fiber reinforced prepreg 4A, on which the foreign fibers 6 are arranged, after the first carbon fiber reinforced prepreg 4A having the foreign fibers 6 is drawn from the drum 20. As the occasion demands, the prepreg is then caused to go between hot rollers or the like.

The first carbon fiber reinforced prepreg 4A and the second carbon fiber reinforced prepreg 4B were the same in construction and were formed into a thickness of 65 μm on the release paper. A PAN type carbon fiber (trade name "M40" made by Toray Industries, Inc. with a diameter of 6.5 μm was used as the carbon fiber. Epoxy resin was used as the matrix resin. The content of the matrix resin was 35 wt %.

Either of boron and titanium fibers were used as the foreign fibers 6.

A boron fiber having a diameter of 100 μm was arranged at intervals of 1 mm and was used. Furthermore, a titanium fiber having a diameter of 100 μm was used and arranged at intervals of 2 mm.

The hybrid prepreg 1 having a width of 300 mm and a length of 1.7 m was obtained by the manufacturing method described above. The thickness (T) of the hybrid prepreg in which the boron fiber was used as the foreign fiber 6 was 138 μm, whereas the content of the matrix resin was 31.5 wt %. The thickness (T) of the hybrid prepreg in which the titanium fiber was used as the foreign fiber 6 was 134 μm, while the content of the matrix resin was 32.0 wt %.

Figure 8:
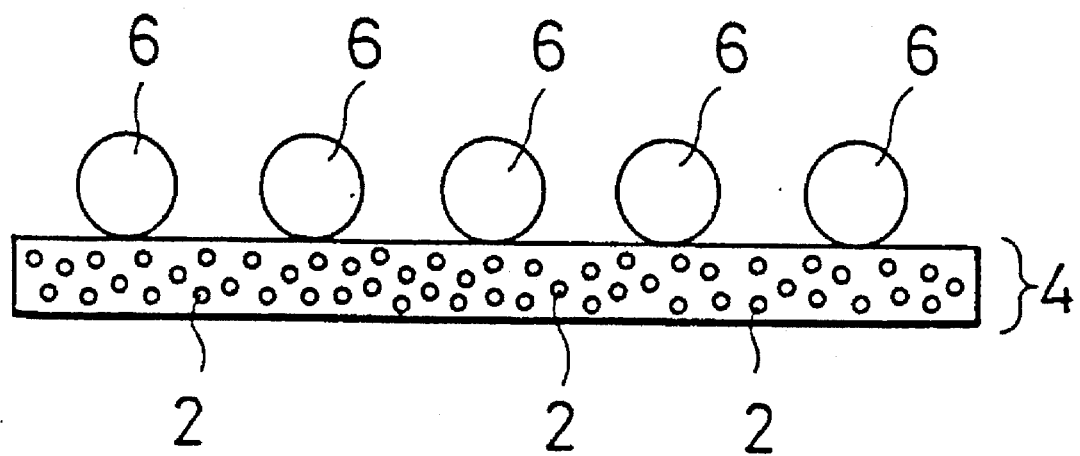
FIG. 8 is a cross-section view in which the structure of the conventional hybrid prepreg is shown.

The mechanical strength or the like of such a hybrid prepreg was measured. It was found that although the thickness of the hybrid prepreg in accordance with the present invention was thin, the compression strength and elasticity modulus of the hybrid prepreg were superior to those of the conventional hybrid prepreg shown in FIG. 8. Also, the feel at the use of the product manufactured with the hybrid prepreg was excellent.

In addition, when the manufacturing method for the hybrid prepreg using the drum winder in accordance with the present invention was employed, it was found that the manufacturing method provided better workability than the manufacturing method shown in FIG. 6. This was because in the manufacturing method according to this invention, it was not necessary to alternately arrange the carbon fibers and the foreign fibers on the coated paper. Furthermore, in the manufacturing method for the hybrid prepreg in accordance with this invention, the fibers were not twisted in the longitudinal direction of the fiber, and thus the mechanical properties of the hybrid prepreg were improved. Moreover, the appearance of such a hybrid prepreg was appealing.

Then, a method of manufacturing the hybrid prepreg 1 having an elongated length according to the present invention will be described with reference to the drawings.

Figure 9:
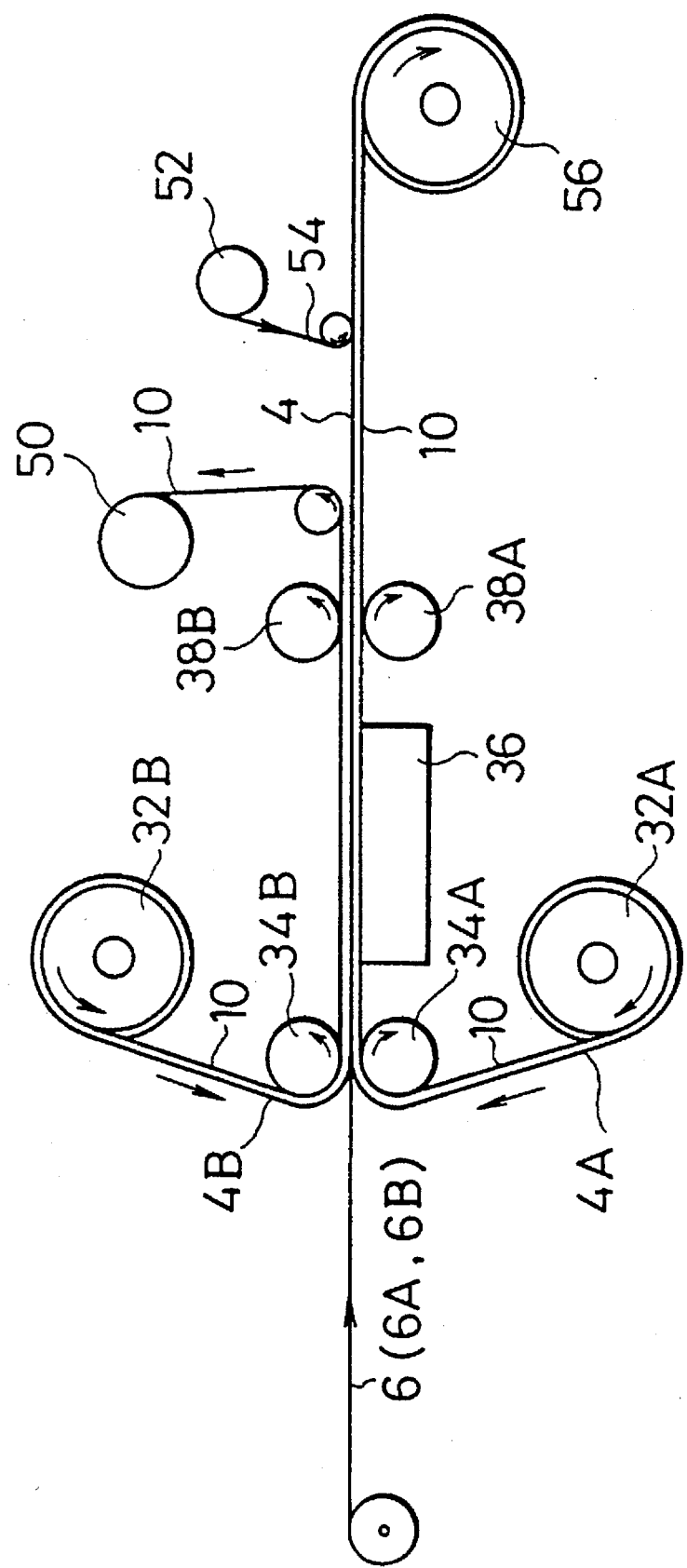
FIGS. 9 and 10 are cross sectional structural views which illustrate a method of manufacturing an elongated hybrid prepreg according to another embodiment of the present invention.

FIG. 9 illustrates an embodiment of a manufacturing apparatus for executing the method of manufacturing the elongated hybrid prepreg 1 according to the present invention.

According to this embodiment, the first and second carbon fiber reinforced prepregs 4A and 4B which employ the carbon fibers 2 as the reinforcing fibers are, in a state where the same is held by the release paper 10 and in the form of a wound roll, attached to unwinders (supply side portion) 32A and 32B, respectively. The carbon fiber reinforced prepregs 4A and 4B with the release paper unwound from the unwinding portions 32A and 32B are supplied to the space between press rolls 34A and 34B.

On the other hand, the foreign fibers 6 are supplied to the space between the press rolls 34A and 34B while being disposed in parallel to each other at a predetermined interval on one plane. Therefore, the carbon fiber reinforced prepregs 4A and 4B with the release paper unwound from the unwinding portions 32A and 32B are introduced between the press rolls 34A and 34B along the foreign fibers 6 while holding the foreign fibers 6.

The first and second carbon fiber reinforced prepregs 4A and 4B thus pass through the press rolls 34A and 34B while holding the foreign fibers 6. Then, they are introduced into a hot plate 36 and second press rolls 38A and 38B. During this process, the foreign fibers 6 are embedded and impregnated into the first and second carbon fiber reinforced prepregs 4A and 4B. As a result, the hybrid fiber reinforced composite resin layer 4 is formed in which the first and second carbon fiber reinforced prepregs 4A and 4B and the foreign fibers 6 are integrally formed.

Then, the two release papers holding the hybrid fiber reinforced composite resin layer 4 is cooled by a cooling means (omitted from illustration) by a cold plate or the like. Then, according to this embodiment, only the upper separating sheet 10 is, by a winder 50, separated from the fiber reinforced composite resin layer 4. A cover film 54 supplied from an unwinder 52 is applied to the surface of the fiber reinforced composite resin layer 4 adhered to the surface of the lower separating sheet 10. Then, it is wound by a winder 56 as a hybrid prepreg product.

According to the manufacturing method according to this embodiment, the above-structured manufacturing apparatus is arranged in such a manner that the interval between the press rolls 34A and 34B and/or the interval between the press rolls 38A and 38B is determined to be 0.7 to 0.8 times the total thickness of the first and second carbon fiber reinforced prepregs 4A and 4B with the release paper. Furthermore, the hot plate 36 heats the first and the second carbon fiber reinforced prepregs 4A and 4B so as to make the viscosity of the matrix resin in the first and the second carbon fiber reinforced prepregs 4A and 4B to be 1000 to 50000 cp. It has been found that the foreign fibers 6 can therefore be satisfactorily impregnated into the matrix resin layer of the first and the second carbon fiber reinforced prepregs 4A and 4B. As a result, the first and second carbon fiber reinforced prepregs 4A and 4B and the foreign fibers 6 can be integrated. If the conditions cannot meet the above-described conditions, the impregnation of the foreign fibers 6 into the central portion of the first and the second carbon fiber reinforced prepregs 4A and 4B cannot be performed satisfactorily. Furthermore, the configuration of the carbon fibers 2 and the foreign fibers 6 disorders in the lengthwise direction. What is even worse, the joining interface between the first and the second carbon fiber reinforced prepregs 4A and 4B cannot be fused sufficiently, causing a separation to occur in this joining interface.

Thus, the elongated prepreg according to the present invention can efficiently be manufactured by the manufacturing apparatus according to the above-described embodiment.

Figure 10:
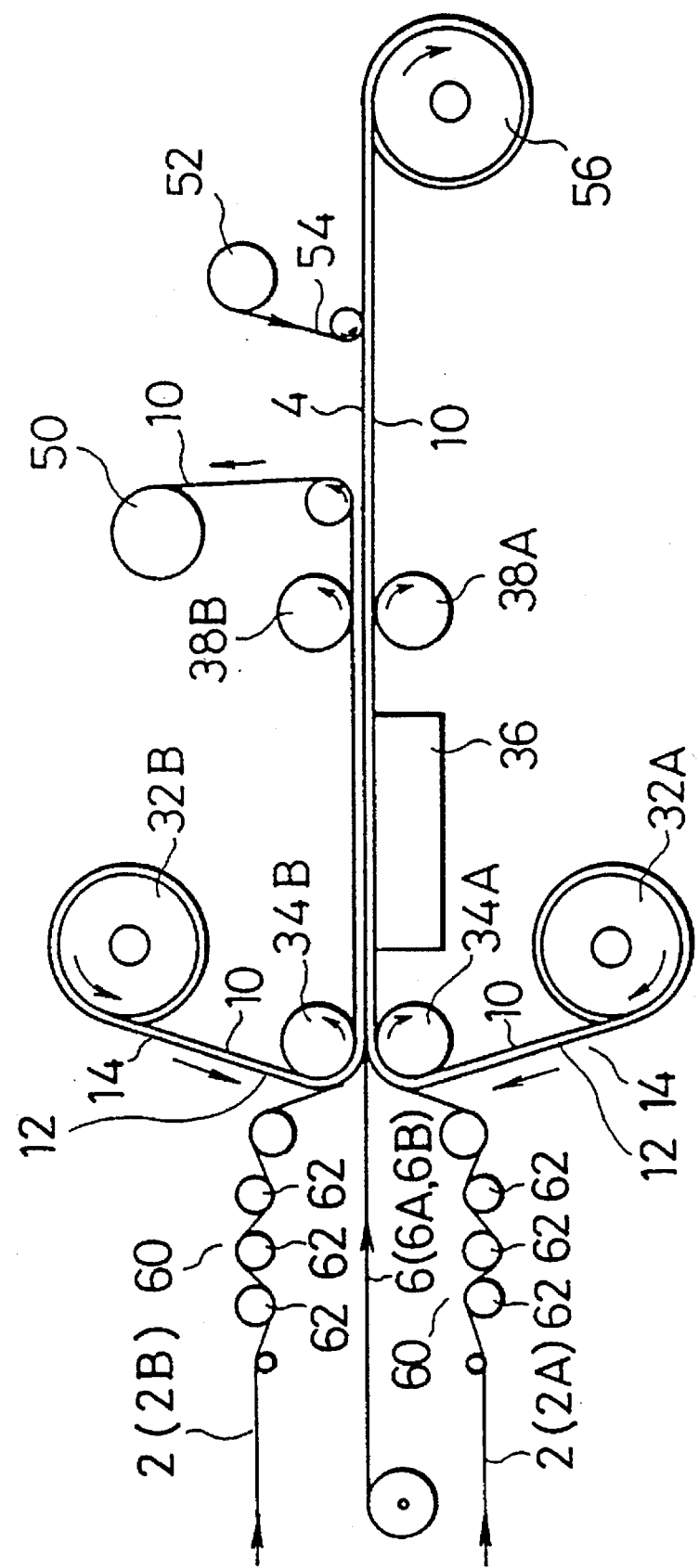

FIG. 10 illustrates another embodiment for manufacturing the elongated hybrid prepregs 1.

According to this embodiment, the foreign fibers 6 were supplied to the space between the press rolls 34A and 34B while disposed at a predetermined interval on one plane. On the other hand, the carbon fibers 2 for use as the reinforcing fibers according to this embodiment are opened by an opening means comprising, for example, a successive opening bar. The thus opened carbon fibers 2 are successively supplied to the space between the press rolls 34*a* and 34B from the two sides of the above-described foreign fibers 6 along the foreign fibers 6.

Furthermore, the first and the second resin coated papers 14 formed by applying the matrix resin 12 to the release paper 10 are, in the form of a wound roll, attached to unwinders (supply side portion).32A and 32B. The resin coated papers 14 are supplied to the space between the press rolls 34A and 34B while holding the foreign fibers 6 and the carbon fibers 2.

Therefore, the resin coated paers 14 drawn from the supply side portions 32A and 32B are caused to pass through the space between the press rolls 34A and 34B along the foreign fibers 6 and the carbon fibers 2 while holding the foreign fibers 6 and the carbon fibers 2.

The first and the second resin coated papers 14 pass through the press rolls 34A and 34B while holding the foreign fibers 6 and the carbon fibers 2 before they are introduced into the second press rolls 38A and 38B. During this process, the foreign fibers 6 and the carbon fibers 2 are impregnated into the matrix resin 12 of the first and the second resin coated papers 14. As a result, the hybrid fiber reinforced composite resin layer 4, which is formed by integrating the matrix resin 12, the carbon fibers 2 and the foreign fibers 6, is formed.

Then, the two release papers holding the above-described hybrid fiber reinforced composite resin layer 4 are cooled by a cooling means (omitted from illustration) such as the cold plate. Then, only the upper release paper 10 is, according to this embodiment, separated from the fiber reinforced composite resin layer 4 by the winder 50. The cover film 54 supplied from the unwinder 52 is applied to the surface of the fiber reinforced composite resin layer 4 adhered to the lower release paper 10. Then, the thus manufactured hybrid prepreg product is wound on the winder 56.

According to this embodiment, it is preferable that the above-structured manufacturing apparatus is arranged in such a manner that the interval between the press rolls 34A and 34B and/or the interval between the press rolls 38A and 38B is determined to be 0.7 to 0.8 times the total thickness of the first and the second resin coated papers 14. Furthermore, the hot plate 36 heats the first and the second resin coated papers 14 so as to make the viscosity of the matrix resin 12 in the first and the second resin coated papers 14 to be 1000 to 50000 cp. As a result, the foreign fibers 6 and the carbon fibers 2 can be satisfactorily impregnated into the matrix resin 12 of the first and the second resin coated papers 14. As a result, the matrix resin in the first and the second resin coated papers 14, the carbon fibers 2 and the foreign fibers 6 can be integrated. When the above-described conditions are selected, the lengthwise disorder of the configuration of the carbon fibers 2 and the foreign fibers 6 can be prevented. In particular, the foreign fibers 6 can satisfactorily be impregnated into the central portion of the matrix resin layer. In addition, the joining interface of the matrix resin 12 of the first and the second resin coated papers 14 can be sufficiently fused. Therefore, the separation taken place at this joining interface can be prevented.

Thus, the hybrid prepregs can efficiently successively manufactured by the manufacturing apparatus according to the above-described manufacturing apparatus.

Embodiment 2

Figure 11:
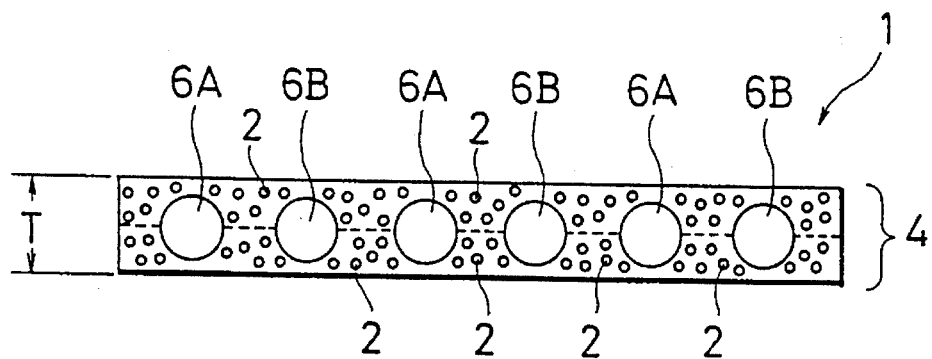
FIGS. 11 to 14 are cross sectional structural views which illustrate a hybrid prepreg according to another embodiment of the present invention.

FIG. 11 illustrates the second embodiment of the hybrid prepreg according to the present invention. According to the hybrid prepreg 1 of this embodiment, the reinforcing fibers 2 are carbon fibers, and the foreign fibers 6 are composed of boron fibers 6A and one or a plurality of different fibers (second foreign fibers) 6B which differ from the boron fibers 6A and the carbon fibers 2. The different fiber 6B is selected from an inorganic fiber such as a glass fiber, an alumina fiber, a silicon carbide fiber and a silicon nitride fiber; an organic fiber such as an aramid fiber, a polyarylate fiber, and a polyethylene fiber; and a metal fiber such as a titanium fiber, an amorphous fiber and a stainless steel fiber. Although the boron fibers 6A and the different fibers 6B are alternately arranged according to this embodiment of FIG. 11, the method of arrangement of the boron fibers 6A and the different fibers 6B is not limited to this. An optional arrangement may be employed to meet the desire.

Figure 12:
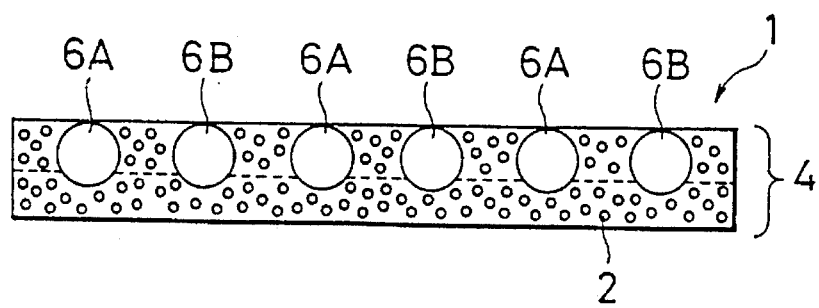

It is preferable that the boron fibers 6A and the different fibers 6B be, as shown in FIG. 11, disposed at the central portion of a unidirectional carbon fiber prepreg 4. However, if they are, as shown in FIG. 12, disposed while slightly deviating from the central portion, a similar operation and effects can be realized.

Furthermore, according to the present invention, the number of types of the different fibers 6B contained in the hybrid prepreg 1 is not limited to one and may be a plurality of, for example, two or three different types of fibers. For example, FIG. 3 illustrates an example of the structure in which the different fibers 6B comprise two different types of fibers 6Ba and 6Bb.

Figure 13:
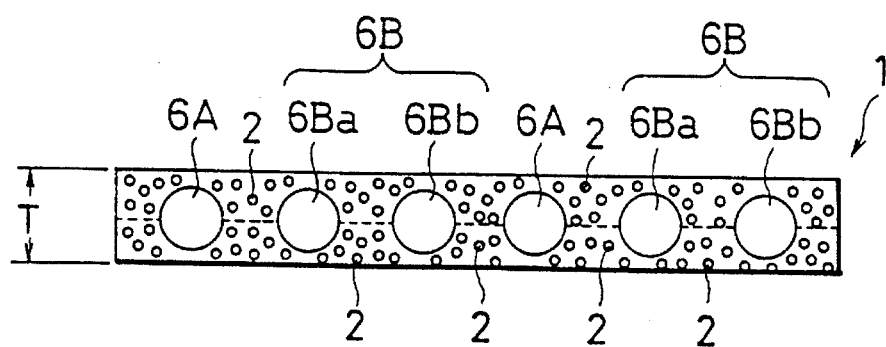
Figure 14:
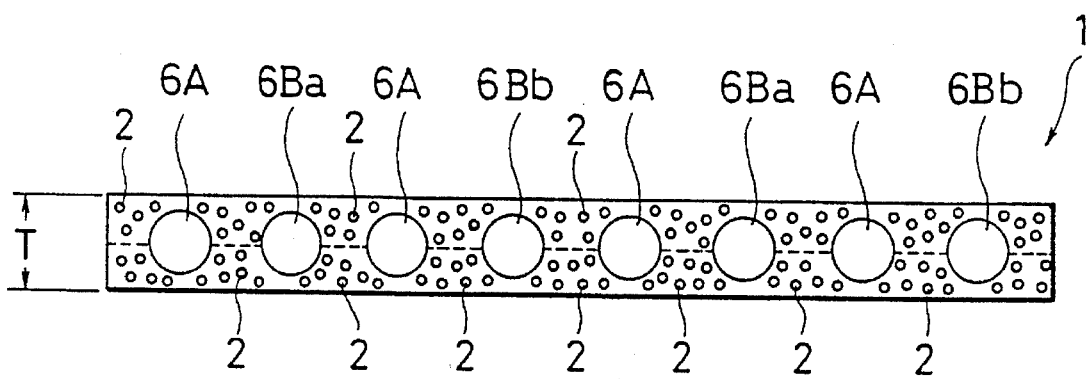
Figure 15:
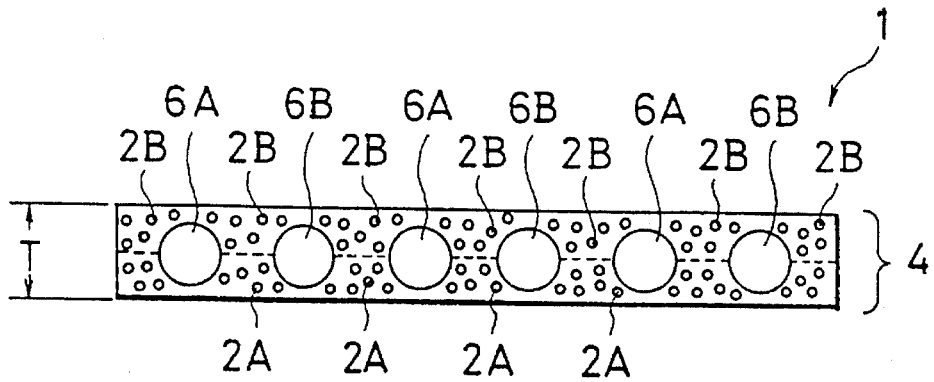
FIGS. 15 to 18 are cross sectional structural views which illustrate a hybrid prepreg according to another embodiment of the present invention.
Figure 16:
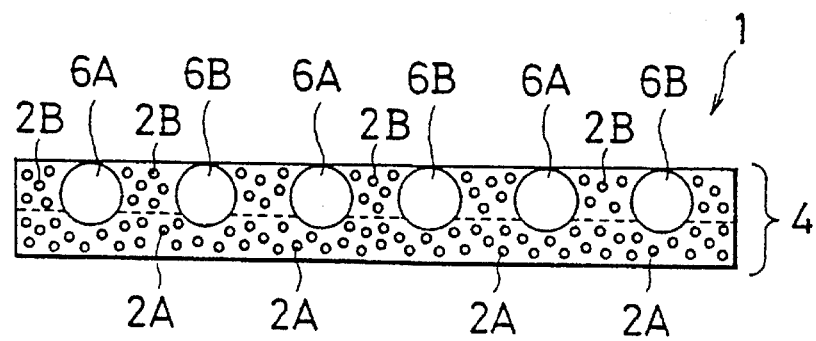
Figure 17:
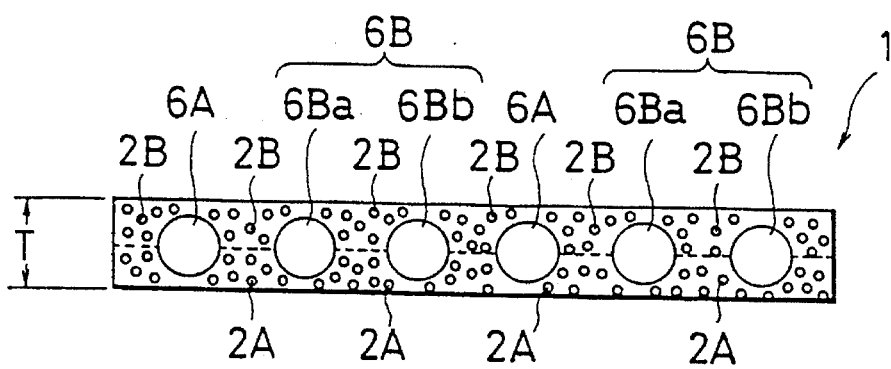
Figure 18:
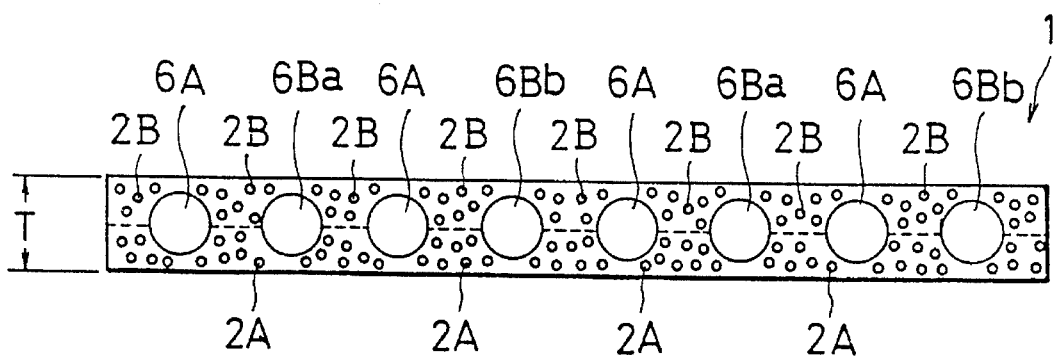

In the above-described case in which the different fibers 6B comprise a plurality of different types of fibers 6Ba and 6Bb, the different fibers 6Ba and 6Bb may be, as shown in FIG. 13, disposed among the boron fibers 6A. Alternative to this, the plurality of different types of fibers 6Ba and 6Bb may alternately be disposed with respect to the boron fibers 6A as shown in FIG. 14. The arrangement of the different fibers 6B (6Ba and 6Bb) and the boron fibers 6A may be optionally selected to meet the desire as described above.

The boron fiber 6A according to the present invention usually has a fiber diameter of 50 to 150 µm, preferably 70 to 120 µm.

As the different fiber 6B7 it is preferable that a metal fiber such as a titanium fiber, an amorphous fiber or a stainless steel fiber be used. Usually, the diameter of the fiber of this type is arranged to be 50 to 150 µm, preferably 70 to 120 µm.

Furthermore, according to the present invention, as the different fiber 6B, an inorganic fiber such as a glass fiber, an alumina fiber, a silicon carbide fiber and a silicon nitride fiber and various organic fibers such as an alamide fiber, a polyarylate fiber and a polyethylene fiber may be used. Since fiber f of this type usually has a small fiber diameter, that is, diameter (d) of the monofilament thereof is 5 to 50 µm.

Therefore, in the case where fiber f having a small fiber diameter is employed as the different fiber 6B, as shown in FIG. 4, it is used in the form of a strand (fiber tow) in which many fibers are bundled. Therefore, even a metal fiber having a small diameter can be used in the form of a strand.

The hybrid prepreg according to the present invention may be composed of the carbon fibers, the boron fibers, the different fibers and the matrix resin at a desired mixture ratio. Generally, it is arranged,.by weight %, in such a manner that carbon fiber: boron fiber: different fiber: matrix resin is (30 to 75): (2 to 15): (2 to 15): (25 to 40). According to the present invention, thickness (T) of the prepreg can be made to be substantially the same as the fiber diameter of that of the boron fiber and that of the different fiber. It is usually arranged to be about 80 to 200 µm.

Furthermore, the hybrid prepreg 1 according to the present invention was manufactured by a drum winder, as shown in FIG. 7.

The carbon fibers 2 serving as the reinforcing fibers employed a PAN type carbon fiber (trade name "M40" manufactured by Toray Industries, Inc.), the fiber diameter being arranged to be 6.5 µm. The matrix resin comprised an epoxy resin. Furthermore, the content of the matrix resin was 33 wt %.

As the boron fiber 6A, a fiber the fiber diameter of which was 100 µm was used. As the different fiber 6B, a strand formed by bundling 300 polyarylate fibers (Vectran) the fiber diameter of which was 23 µm was used. The boron fiber 6A and the different fibers 6B were disposed at an interval of 2 mm.

Thus, the hybrid prepreg 1 the width of which was 300 mm, the length of which was 1.7 m and the thickness (T) of which was 160 µm was manufactured. The mixture ratio of the carbon fibers, the boron fibers, the different fibers and the matrix resin in the hybrid prepreg according to this embodiment was arranged by wt % in such a manner that carbon fiber: boron fiber: different fiber: matrix resin=54: 2: 17: 27.

The mechanical strength of the hybrid prepreg thus manufactured was measured. The hybrid prepreg 1 according to the present invention exhibited excellent compressive strength and elastic modulus with respect to the conventional hybrid prepreg shown in FIG. 8 although the thickness according to the present invention was reduced. In particular, in the case where it is used in a golf shaft or the like, the satisfactory feel (shooting feeling) at the time of use and excellent impact resistance can be realized while maintaining the excellent mechanical strength and the shooting range. Furthermore, satisfactory appearance was displayed.

Table 1 shows the hybrid prepregs manufactured in accordance with the above-described methods while changing the type of the different fiber 6B and the results of evaluation with the golf shafts manufactured by using the hybrid prepregs.

TABLE 1

|  | Different Fiber | Carbon fiber: Different fiber: | Boron fiber: Matrix resin: (wt %) | Mechanical Strength | Impact Resistance | Shooting Range | Feel at Use |
| --- | --- | --- | --- | --- | --- | --- | --- |
| Example 1 | Aramide (Technola) |  | 54:2:17:27 | 0 | ++ | 0 | ++ |
| 2 | Stainless Steel |  | 54:5:14:27 | 0 | 0 | 0 | ++ |
| 3 | Strong Steel |  | 54:5:14:27 | 0 | 0 | 0 | ++ |
| 4 | Silicon Carbide |  | 52:2:19:26 | ++ | 0 | 0 | ++ |

TABLE 1-continued

|  | Different Fiber | Carbon fiber: Different fiber: | Boron fiber: Matrix resin: (wt %) | Mechanical Strength | Impact Resistance | Shooting Range | Feel at Use |
| --- | --- | --- | --- | --- | --- | --- | --- |
|  | (Nicalon) |  |  |  |  |  |  |
| 5 | Alumina | 50:2:23:24 |  | ++ | 0 | 0 | 0 |
| 6 | Glass | 48:2:26:24 |  | 0 | + | 0 | 0 |
| Comparative Example | — | 64:5:—:31 |  | 0 | 0 | 0 | 0 |

0: same as comparative example
+: superior to comparative example
++: significantly superior to comparative example The hybrid prepreg 1 constructed according to this embodiment may be preferably manufactured by a variety of manufacturing methods as described in connection with the hybridprepreg of the first embodiment but the above-described drum winder. Furthermore, the matrix resins and the curing agents as described above may be employed. An elongated hybridprepreg in accordance with the present invention may be successively and effectively manufactured by the manufacturing apparatus as shown in FIG. 9. An embodiment of the manufacturing method according to the above-described embodiment will be specifically described.

The first and the second carbon reinforced prepregs 4A and 4B which used the carbon fibers 2 as the reinforcing fibers were structured similarly to each other. Furthermore, they were respectively formed to have a thickness of 65 μm on the release paper 10 the thickness of which was 120 μm. The carbon fiber 2 comprised PAN type carbon fiber (trade name "M40" manufactured by Toray Industries, Inc.) the fiber diameter of which was arranged to be 6.5 μm. As the matrix resin, epoxy resin was used. In addition, the contents of the matrix resin in the prepreg was 35 wt %.

As the boron fiber 6A, a boron fiber having the fiber diameter of 100 μm was used. As the different fiber 6B, a titanium fiber the fiber diameter of which was 100 μm was used. The boron fibers 6A and the different fibers B were disposed at intervals of 2 mm.

The interval between the press rolls 34A and 34B and that between 38A and 38B were arranged to be 300 μm which is 0.8 times the total thickness of the first and the second carbon fiber reinforced prepregs 4A and 4B with the separating sheet. The hot plate 36 was heated at 100° C. and the viscosity of the matrix resin in the first and the second carbon fiber reinforced prepregs 4A and 4B was arranged to be 2000 cp.

Thus, elongated hybrid prepregs 1 having the width of 300 mm were successively manufactured at a manufacturing speed of 3 m/minute.

The mixture ratio of the carbon fibers, the boron fibers, the different fibers and the matrix resin in the hybrid prepreg according to this embodiment was, by wt %, carbon fiber: boron fiber: different fiber: matrix resin=62: 2.7: 4.3: 31.

The mechanical strength of the hybrid prepreg thus manufactured was measured. The hybrid prepreg according to the present invention exhibited excellent compressive strength and elastic modulus with respect to the conventional hybrid prepreg shown in FIG. 8 although the thickness according to the present invention was reduced. In particular, in the case where it is used in a golf shaft or the like, the satisfactory feel (shooting feeling) at the time of use and excellent impact resistance can be realized while maintaining the excellent mechanical strength and the shooting range. Furthermore, satisfactory appearance was displayed.

Further, an elongated hybrid prepreg in accordance with the present invention may be similarly manufactured with the apparatus as shown in FIG. 10.

An embodiment of the manufacturing method according to the above-described embodiment will be specifically described.

The first and the second resin coated papers 14 were structured similarly to each other. Furthermore, they were respectively formed by applying epoxy resin having a thickness of 35 μm to the release paper 10 the thickness of which was 120 μm. The carbon fibers 2 serving as the reinforcing fibers comprised PAN type carbon fibers (trade name "M40" manufactured by Toray Industries, Inc.) the fiber diameter of which was arranged to be 6.5 μm and arranged in such a manner that 53 fibers are, in parallel, placed on each side of the boron fibers and the different fibers. The carbon fibers were uniformly opened in the widthwise direction by the opening means 60 and were arranged in a region of a width of 300 mm at a predetermined density.

The opening means 60 was structured by an ordinary opening bar which was, according to this embodiment, arranged in such a manner that three stainless steel bars 62 having a diameter of 30 mm were positioned in parallel to one another at intervals of 60 mm. The fibers were introduced through the bars in the form of waves under a tension of 500 g/strand so that the above-described opening operation was performed.

As the boron fiber 6A, a boron fiber having the fiber diameter of 100 μm was used. As the different fiber 6B, a stainless steel fiber the fiber diameter of which was 100 μm were used. The boron fibers 6A and the different fibers 6B were disposed at intervals of 1 mm.

The interval between the press rolls 34A and 34B and that between 38A and 38B were arranged to be 3.0 mm which was 0.8 times the total thickness of the first and the second resin coated papers 14. The hot plate 36 was heated to 100° C. and the viscosity of the matrix resin in the first and the second resin coated papers 14 was arranged to be 2000 cp.

Thus, elongated hybrid prepregs 1 having the width of 300 mm were successively manufactured at a manufacturing speed of 3 m/minute.

The mixture ratio of the carbon fibers, the boron fibers, the different fibers and the matrix resin in the hybrid prepreg according to this embodiment was, by wt %, carbon fiber: boron fiber: different fiber: matrix resin=55: 5 : 13: 27.

The mechanical strength of the hybrid prepreg thus manufactured was measured. The hybrid prepreg according to this embodiment exhibited excellent compressive strength and elastic modulus with respect to the conventional hybrid prepreg shown in FIG. 8 although the thickness according to this embodiment was reduced. In particular, in the case where it is used in a golf shaft or the like, the satisfactory touch (shooting feeling) at the time of use and excellent impact resistance can be realized while maintaining the excellent mechanical strength and the shooting range. Furthermore, satisfactory appearance was displayed.

Embodiment 3

The third embodiment of the hybrid prepreg 1 according to the present invention has a construction similar to that of the second embodiment as described above. Referring to FIG. 11, in the third embodiment the reinforcing fibers 2 are carbon fibers, and the foreign fibers 6 are composed of metal fibers 6A and one or a plurality of different fibers 6B which differ from the metal fibers 6A and the carbon fibers 2. The metal fiber 6A is selected from a titanium fiber, an amorphous fiber and a stainless steel fiber. The different fiber 6B is selected from an inorganic fiber such as a boron fiber with a large fiber diameter, a glass fiber, an alumina fiber, a silicon carbide fiber and a silicon nitride fiber; and an organic fiber such as an aramid fiber, a polyarylate fiber and a polyethylene fiber.

As understood from the above, the hybrid prepreg 1 of the third embodiment is characterized in that the metal fibers is substituted for the boron fibers as the foreign fibers 6 in comparison with the second embodiment.

The hybrid prepreg according to the present invention may be composed of the carbon fibers, the metal fibers, the different fibers and the matrix resin at a desired mixture ratio. Generally, it is arranged, by weight %, in such a manner that carbon fiber: metal fiber: different fiber: matrix resin is (30 to 70): (2 to 30): (2 to 30): (20 to 40). According to the present invention, thickness (T) of the prepreg can be made to be substantially the same as the fiber diameter of that of the metal fiber and that of the different fiber. It is usually arranged to be about 80 to 200 μm. Table 2 shows the hybrid prepregs of this embodiment manufactured with the same drum winder as that of the second embodiment while changing the type of the different fiber 6B, and the results of evaluation with the golf shafts manufactured by using the hybrid prepregs.

An elongated hybridprepreg in accordance with this embodiment may be successively and effectively manufactured by the manufacturing apparatus as shown in FIGS. 9 and 10 which have been described in detail in connection with the second embodiment.

Embodiment 4

The fourth embodiment of the hybrid prepreg 1 according to the present invention has a construction similar to that of the second embodiment as described above. Referring to FIG. 11, in the fourth embodiment the reinforcing fibers 2 are carbon fibers, and the foreign fibers 6 are composed of organic fibers 6A and different fibers 6B which are glass fibers and/or inorganic fibers. The organic fiber 6A is selected from an aramid fiber, a polyarylate fiber and a polyethylene fiber, and the different fiber 6B is one or a plurality of fibers selected from a boron fiber with a large fiber diameter, an alumina fiber, a silicon carbide fiber and a silicon nitride fiber.

As understood from the above, the hybrid prepreg 1 of the fourth embodiment is characterized in that the organic fibers is substituted for the boron fibers as the foreign fibers 6 in comparison with the second embodiment, and that the inorganic fibers are used as the different fibers.

The hybrid prepreg according to the present invention may be composed of the carbon fibers, the organic fibers, the different fibers and the matrix resin at a desired mixture ratio. Generally, it is arranged, by weight %, in such a manner that carbon fiber: organic fiber: different fiber: matrix resin is (30 to 70): (2 to 30): (2 to 30): (20 to 40). According to the present invention, thickness (T) of the prepreg can be made to be substantially the same as the fiber diameter of that of the organic fiber and that of the different

TABLE 2

|  | Metal Fiber | Different Fiber | Carbon fiber: Different fiber: Metal fiber: Matrix resin: (wt %) | Mechanical Strength | Impact Resistance | Feel at Use |
| --- | --- | --- | --- | --- | --- | --- |
| Example 1 | Titanium | Polyarylate (Vectran) | 53:4:17:26 | 0 | ++ | ++ |
| 2 | Titanium | Aramid (Technola) | 53:4:17:26 | 0 | ++ | ++ |
| 3 | Titanium | Silicon Carbide | 52:4:19:25 | ++ | + | 0 |
| 4 | Titanium | Alumina | 49:3:23:24 | ++ | + | 0 |
| Comparative Example | Titanium | — | 64:4:—:32 | 0 | 0 | 0 |
| Example 5 | Stainless Steel | Silicon Carbide | 50:6:19:25 | ++ | 0 | 0 |
| 6 | Stainless Steel | Alumina | 48:6:22:24 | ++ | 0 | 0 |
| 7 | Stainless Steel | Aramid (Technola) | 52:7:16:25 | 0 | ++ | ++ |
| 8 | Stainless Steel | Polyarylate (Vectran) | 52:7:16:25 | 0 | ++ | ++ |
| Comparative Example | Stainless Steel | — | 62:8:—:30 | 0 | 0 | 0 |

0: same as comparative example
+: superior to comparative example
++: significantly superior to comparative example The hybrid prepreg 1 constructed according to this embodiment may be preferably manufactured by a variety of manufacturing methods as described in connection with the hybridprepreg of the first embodiment but the above-described drum winder. Furthermore, the matrix resins and the curing agents as described above may be employed.

fiber. It is usually arranged to be about 80 to 200 μm. Table 3 shows the hybrid prepregs of this embodiment manufactured with the same drum window as that of the second embodiment while changing the type of the different fiber 6B, and the results of evaluation with the golf shafts manufactured by using the hybrid prepregs.

TABLE 3

| | Organic Fiber | Different Fiber | Carbon fiber: Different fiber: | Organic fiber Matrix resin (wt %) | Impact Resistance | Feel at Use | |
|---|---|---|---|---|---|---|---|
| Example 1 | Polyarylate (Vectran) | Silicon Carbide (Nicalon) | | 46:14:17:23 | ++ | 0 | 0 |
| 2 | Polyarylate (Vectran) | Alumina | | 44:14:20:22 | ++ | 0 | 0 |
| 3 | Polyarylate (Vectran) | Glass | | 40:13:22:20 | 0 | + | 0 |
| Comparative Example | Polyarylate (Vectran) | — | | 55:17:—:27 | 0 | 0 | 0 |
| Example 4 | Aramid (Technola) | Silicon Carbide (Nicalon) | | 46:14:17:23 | ++ | 0 | 0 |
| 5 | Aramid (Technola) | Alumina | | 44:14:20:22 | ++ | 0 | 0 |
| 6 | Aramid (Technola) | Glass | | 40:13:22:20 | 0 | + | 0 |
| Comparative Example | Aramid (Technola) | — | | 55:17:—:27 | 0 | 0 | 0 |

0: same as comparative example
+: superior to comparative example
++: significantly superior to comparative example Embodiment 5

FIGS. 15 to 18 illustrate the construction of a hybrid prepreg of the fifth embodiment according to the present invention. The hybrid prepreg of this embodiment is constructed similarly to the hybrid prepreg 1 of the second embodiment which is described in connection with FIG. 11, except that the reinforcing fibers 2 are composed of carbon fibers 2A which are arranged in one direction on one side of the prepreg and glass fibers 2B which are arranged in the same direction as that of the carbon fibers 2A on the other side of the prepreg. The foreign fibers are composed of boron fibers 6A and one or a plurality of different fibers 6B which are different from the boron fibers 6A, the carbon fibers 2A and the glass fibers 2B. The different fiber 6B is selected from an inorganic fiber such as an alumina fiber, a silicon carbide fiber and a silicon nitride fiber; an organic fiber such as an aramid fiber, a polyarylate fiber and a polyethylene fiber; and a metal fiber such as a titanium fiber, an amorphous fiber and a stainless steel fiber.

Although the boron fibers 6A and the different fibers 6B are alternately arranged in this embodiment, the method of arrangement of the boron fibers 6A and the different fibers 6B is not limited to this. An optional arrangement may be employed to meed the desire.

It is preferable that the boron fibers 6A and the different fibers 6B be, as shown in FIG. 12, disposed at the central portion of a unidirectional carbon fiber prepreg 4. However, if they are, as shown in FIG. 13, disposed while slightly deviating from the central portion to either the glass fibers 2B or the carbon fibers 2A, a similar operation and effects can be realized.

The hybrid prepreg according to this embodiment may be composed of the carbon fibers, the glass fibers, the boron fibers, the different fibers and the matrix resin at a desired mixture ratio. Generally, it is arranged, by weight %, in such a manner that carbon fiber: glass fiber: boron fiber: different fiber: matrix resin is (15 to 40): (15 to 40): (1 to 20): (5 to 30): (20 to 50). According to the present invention, thickness (T) of the prepreg can be made to be substantially the same as the fiber diameter of that of the boron fiber and that of the different fiber. It is usually arranged to be about 80 to 200 μm.

Table 4 shows the hybrid prepregs of this embodiment manufactured with the same drum winder as that of the second embodiment while changing the type of the different fiber 6B, and the results of evaluation with the golf shafts manufactured by using the hybrid prepregs.

TABLE 4

| | Different Fiber | Carbon fiber: Boron fiber: Matrix resin: | Glass fiber: Different fiber: (wt %) | Mechanical Strength | Impact Resistance | Feel at Use | Formability | Beauty of Appearance |
|---|---|---|---|---|---|---|---|---|
| Example 1 | Polyarylate (Vectran) | 25:31:2:15:27 | | 0 | ++ | ++ | ++ | ++ |
| 2 | Armid (Technola) | 25:31:2:15:27 | | 0 | ++ | ++ | ++ | ++ |
| 3 | Titanium | 28:35:2:4:31 | | 0 | 0 | ++ | ++ | ++ |
| 4 | Stainless Steel | 27:34:2:7:30 | | 0 | 0 | ++ | ++ | ++ |
| 5 | High Strength Steel | 27:34:2:7:30 | | 0 | 0 | ++ | ++ | ++ |
| 6 | Silicon Carbide (Nicalon) | 24:30:2:18:26 | | ++ | 0 | 0 | ++ | ++ |
| 7 | Alumina | 23:29:2:21:25 | | ++ | 0 | 0 | ++ | ++ |

TABLE 4-continued

|  | Different Fiber | Carbon fiber: Boron fiber: Matrix resin: | Glass fiber: Different fiber: (wt %) | Mechanical Strength | Impact Resistance | Feel at Use | Formability | Beauty of Appearance |
|---|---|---|---|---|---|---|---|---|
| Comparative Example | — | 63:—:3:34 | | 0 | 0 | 0 | 0 | 0 |

0: same as comparative example
+: superior to comparative example
++: significantly superior to comparative example The hybrid prepreg 1 constructed according to this embodiment may be preferably manufactured by a variety of manufacturing methods as described in connection with the hybridpreg of the first embodiment but the above-described drum winder. Furthermore, the matrix resins and the curing agents as described above may be employed.

An elongated hybridprepreg in accordance with this embodiment may be successively and effectively manufactured by the manufacturing apparatus as shown in FIGS. 9 and 10 which have been described in detail in connection with the second embodiment.

Embodiment 6

A hybrid prepreg 1 of the sixth embodiment has a construction similar to that of the hybrid prepreg 1 of the third embodiment except that in the sixth embodiment the reinforcing fibers 2 are composed of carbon fibers 2A arranged in one direction on one side of the prepreg, and glass fibers 2B on the other side in the same direction as that of the carbon fibers 2A. Namely, as shown in FIGS. 15 to 18, the foreign fibers 6 are composed of metal fibers 6A and one or a plurality of different fibers 6B which differ from the metal The hybrid prepreg according to the present invention may be composed of the carbon fibers, the glass fiber, the metal fibers, the different fibers and the matrix resin at a desired mixture ratio. Generally, it is arranged, by weight %, in such a manner that carbon fiber: glass fiber: metal fiber: different fiber: matrix resin is (15 to 40): (15 to 40): (1 to 20): (5 to 30): (20 to 50). According to the present invention, thickness (T) of the prepreg can be made to be substantially the same as the fiber diameter of that of the metal fiber and that of the different fiber. It is usually arranged to be about 80 to 200 μm.

Table 5 shows the hybrid prepregs of this embodiment manufactured with the same drum winder as that of the second embodiment while changing the type of the metal fiber 6A and the different fiber 6B, and the results of evaluation with the golf shafts manufactured by using the hybrid prepregs.

TABLE 5

|  | Metal Fiber | Different Fiber | Carbon fiber: Metal fiber: Matrix resin: | Glass fiber: Different fiber: (wt %) | Mechanical Strength | Impact Resistance | Feel at Use | Form- ability | Beauty of Appearance |
|---|---|---|---|---|---|---|---|---|---|
| Example 1 | Titanium | Polyarylate (Vectran) | 24:31:3:15:27 | | 0 | ++ | ++ | ++ | ++ |
| 2 | Titanium | Amid (Technola) | 24:31:3:15:27 | | 0 | ++ | ++ | ++ | ++ |
| 3 | Titanium | Silicon Carbide | 23:30:3:18:26 | | ++ | + | 0 | ++ | ++ |
| 4 | Titanium | Alumina | 23:28:3:21:25 | | ++ | + | 0 | ++ | ++ |
| Comparative Example | Titanium | — | 62:—:4:—:34 | | 0 | 0 | 0 | 0 | 0 |
| Example 5 | Stainless Steel | Silicon Carbide | 23:29:6:17:25 | | ++ | 0 | 0 | ++ | ++ |
| 6 | Stainless Steel | Alumina | 22:28:6:21:24 | | ++ | 0 | 0 | ++ | ++ |
| 7 | Stainless Steel | Aramid (Technola) | 24:30:6:15:25 | | 0 | ++ | ++ | ++ | ++ |
| 8 | Stainless Steel | Polyarylate (Vectran) | 24:30:6:15:25 | | 0 | ++ | ++ | ++ | ++ |
| Comparative Example | Stainless Steel | — | 61:—:8:—:31 | | 0 | 0 | 0 | 0 | 0 |

0: same as comparative example
+: superior to comparative example
++: significantly superior to comparative example fibers 6A, the carbon fibers 2A and the glass fiber 2B. The metal fiber 6A is selected from a titanium fiber, an amorphous fiber and a stainless steel fiber. The different fiber 6B is selected from an inorganic fiber such as a boron fiber with a large fiber diameter, an alumina fiber, a silicon carbide fiber and a silicon nitride fiber; and an organic fiber such as an aramid fiber, a polyarylate fiber and a polyethylene fiber.

The hybrid prepreg 1 constructed according to this embodiment may be preferably manufactured by a variety of manufacturing methods as described in connection with the hybridpreg of the first embodiment but the above-described drum winder. Furthermore, the matrix resins and the curing agents as described above may be employed.

An elongated hybridprepreg in accordance with this embodiment may be successively and effectively manufactured by the manufacturing apparatus as shown in FIGS. 9 and 10 which have been described in detail in connection with the second embodiment.

Embodiment 7

A hybrid prepreg 1 of the seventh embodiment has a construction similar to that of the hybrid prepreg 1 of the fourth embodiment except that in the seventh embodiment the reinforcing fibers 2 are composed of carbon fibers 2A arranged on one side of the prepreg in one direction, and glass fibers 2B on the other hand in the same direction as that of the carbon fibers 2A. Namely, as shown in FIGS. 15 to 18, the foreign fibers 6 are composed of organic fibers 6A and different fibers 6B which are inorganic fibers except for glass fibers. The organic fiber 6A is selected from an aramid fiber, an polyarylate fiber and a polyethylene fiber, and the different fiber 6B is one or a plurality of a boron fiber with a large fiber diameter, an alumina fiber, a silicon carbide fiber and a silicon nitride fiber.

The hybrid prepreg according to the present invention may be composed of the carbon fibers, the glass fiber, the organic fibers, the different fibers and the matrix resin at a desired mixture ratio. Generally, it is arranged, by weight %, in such a manner that carbon fiber: glass fiber: organic fiber: different fiber: matrix resin is (15 to 40): (15 to 40): (1 to 20): (5 to 30): (20 to 50). According to the present invention, thickness (T) of the prepreg can be made to be substantially the same as the fiber diameter of that of the organic fiber and that of the different fiber. It is usually arranged to be about 80 to 200 μm.

Table 6 shows the hybrid prepregs of this embodiment manufactured with the same drum winder as that of the second embodiment while changing the type of the organic fiber 6A and the different fiber 6B, and the results of evaluation with the golf shafts manufactured by using the hybrid prepregs.

The hybrid prepreg 1 constructed according to this embodiment may be preferably manufactured by a variety of manufacturing methods as described in connection with the hybridprepreg of the first embodiment but the above-described drum winder. Furthermore, the matrix resins and the curing agents as described above may be employed.

An elongated hybridprepreg in accordance with this embodiment may be successively and effectively manufactured by the manufacturing apparatus as shown in FIGS. 9 and 10 which have been described in detail in connection with the second embodiment.

Embodiment 8

Figure 19:
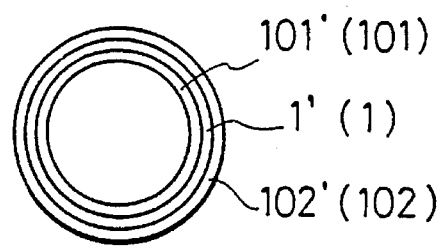
FIGS. 19 and 20 are cross sectional views of a golf club shaft of the present invention.

A golf club shaft of the present invention may be manufactured, as shown in FIG. 19, by preparing a prepreg 101 in which carbon fibers are preferably arranged so as to make an angle (θ) (usually, θ is 35° to 45°) with respect to the axis of the golf club shaft, and a prepreg 102 in which carbon fibers are arranged in parallel with the axis of the golf club shaft; disposing any one of the hybrid prepregs 1 of the first to seventh embodiments constructed according to the present invention between both prepregs 101 and 102; and curing the prepregs.

In other words, the present invention provides a golf club shaft which comprises an angle layer 101', a hybrid prepreg layer 1' and a straight layer 102'. The hybrid prepreg layer 1' is disposed as the outermost layer as shown in FIG. 20, and alternatively is provided not only between the angle layer 101' and the straight layer 102' but also on the outermost layer the configuration of which is not illustrated.

Figure 20:
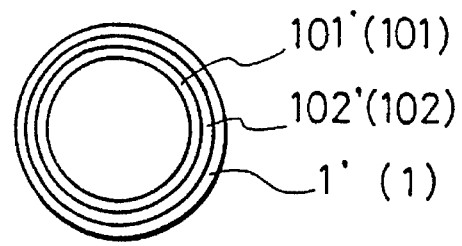

Though in FIGS. 19 and 20 the innermost layer is the angle layer 101', the straight layer 102' may be substituted for the angle layer 101' as the innermost layer. Further, each of the angle layer 101' and the straight layer 102' is not limited to one layer but may be employed in the form of a plurality of layers if desired. The angle layer 101' and the straight layer 102' may be formed of the conventional carbon fiber reinforced prepregs 101 and 102, respectively. Namely, each of the carbon fiber reinforced prepregs 101 and 102 may be composed of a carbon fiber (including a graphite fiber) as a reinforcing fiber and, as a matrix resin, a thermosetting resin such as an epoxy resin, an unsaturated polyester resin, a polyurethane resin, a diallyl phthalate resin and a phenolic resin. Moreover, a curing agent and another additive such as a flexibilizer can be appropriately added so that the curing temperature ranges from 50° to 200° C.

TABLE 6

|  | Organic Fiber | Different Fiber | Carbon fiber: Organic fiber: Matrix resin | Glass fiber: Different fiber (wt %) | Mechanical Strength | Impact Resistance | Feel at Use | Formability | Beauty of Appearance |
| --- | --- | --- | --- | --- | --- | --- | --- | --- | --- |
| Example 1 | Polyarylate (Vectran) | Silicon Carbide (Nicalon) | 21:27:13:16:23 |  | ++ | 0 | 0 | ++ | ++ |
| 2 | Polyarylate (Vectran) | Alumina | 20:26:13:19:22 |  | ++ | 0 | 0 | ++ | ++ |
| Comparative Example | Polyarylate (Vectran) | — | 53:—:17:—:30 |  | 0 | 0 | 0 | 0 | 0 |
| Example 3 | Aramid (Technola) | Silicon Carbide (Nicalon) | 21:27:13:16:23 |  | ++ | 0 | 0 | ++ | ++ |
| 4 | Aramid (Technola) | Alumina | 20:26:13:19:22 |  | ++ | 0 | 0 | ++ | ++ |
| Comparative Example | Aramid (Technola) | — | 53:—:17:—:30 |  | 0 | 0 | 0 | 0 | 0 |

0: same as comparative example
+: superior to comparative example
++: significantly superior to comparative example Embodiment 9

Figure 21:
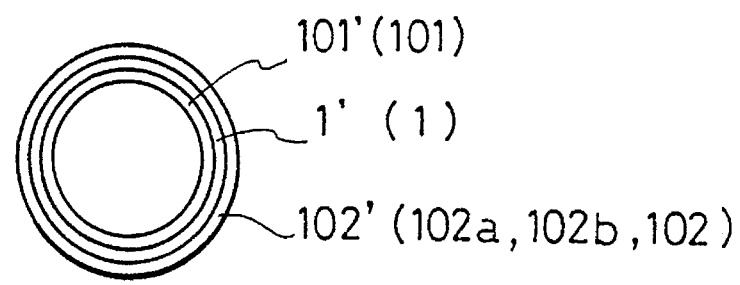
FIGS. 21 and 22 are cross sectional views of a fishing rod of the present invention.
Figure 22:
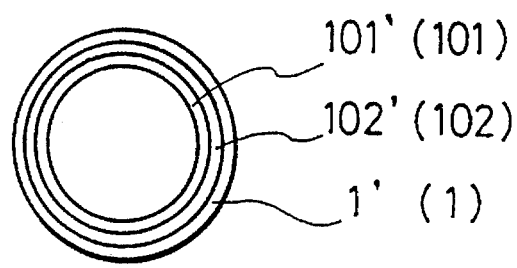

A fishing rod of the present invention may be preferably manufactured, as shown in FIG. 21, by preparing a unidirectional prepreg 101 in which carbon fibers are arranged in parallel with the axis of the fishing rod (θ is 0° C.), and either a cloth prepreg 102a in which a carbon fiber cloth is used as a reinforcing fiber or a prepreg 102b in which carbon fibers are arranged at an angle of 90° with respect to the axis of the fishing rod; disposing between both prepregs 101 and 102 any one of the hybrid prepregs 1 of the first to seventh embodiments constructed according to the present invention; winding the prepregs around a mandrel; and curing the prepregs. In other words, the present invention provides a fishing rod which comprises a straight layer 101', a hybrid prepreg layer 1' and a cloth or 90° layer 102'. The hybrid prepreg layer 1' is disposed as the outermost layer as shown in FIG. 22, and alternatively is provided not only between the straight layer 101' and the cloth of 90° layer 102' but also on the outermost layer the configuration of which is not illustrated. Though in FIGS. 21 and 22 the innermost layer is the straight layer 101', the straight layer 101' may be the outermost layer. Further, each of the straight layer 101' and the cloth or 90° layer 102' is not limited to one layer but may be employed in the form of a plurality of layers if desired. Furthermore, the fishing rod of this invention may be manufactured by using only a plurality of the straight layer 101', if necessary.

The straight layer 101' and the cloth on 90° layer 102' may be formed of the conventional unidirectional carbon fiber reinforced prepreg 101 or cloth or 90° carbon fiber reinforced prepreg 102.

Namely, each of the carbon fiber reinforced prepregs 101 and 102 may be composed of a carbon fiber (including agraphite fiber) as a reinforcing fiber and, as a matrix resin, a thermosetting resin such as an epoxy resin, an unsaturated polyester resin, a polyurethane resin, a diallyl phthalate resin and a phenolic resin. Moreover, a curing agent and another additive such as a flexibilizer can be appropriately added so that the curing temperature ranges from 50° to 200° C.

Embodiment 10

Figure 23:
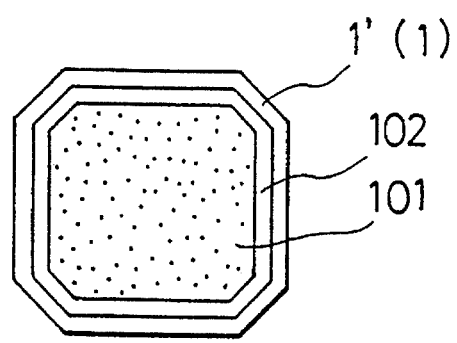
FIG. 23 is a cross sectional view of a racket frame of the present invention.

A racket frame of the present invention may be preferably manufactured, as shown in FIG. 23, by winding a fiber reinforced prepreg to form a shell by a predetermined number of sheets around a core 101 formed of a rigid expanded urethane, etc., and curing the prepreg.

Further, in accordance with the present invention a hybrid prepreg layer 1' is formed as the outermost layer of the shell 102 by using any one of the hybrid prepreg 1 of the first to seventh embodiments constructed according to this invention. The hybrid prepreg layer 1' is disposed, not shown in figures, either between the core 101 and the shell 102 or between the core 101 and the shell 102 and on the outermost layer.

The core 101 may be preferably formed of a rigid expanded urethane or the like. The shell 102 may have a hybrid structure either by being formed of a plurality of carbon fiber reinforced prepregs or by laminating a carbon fiber reinforced prepreg and a glass fiber reinforced prepreg.

The carbon fiber reinforced prepreg and the glass fiber reinforced prepreg may employ the conventional prepregs which may be composed, respectively, of a carbon fiber (including a graphite fiber) and glass fiber as a reinforcing fiber and, as a matrix resin, a thermosetting resin such as an epoxy resin, an unsaturated polyester resin, a polyurethane resin, a diallyl phthalate resin and a phenolic resin. Moreover, a curing agent and another additive such as a flexibilizer can be appropriately added so that the curing temperature ranges from 50° to 200° C.

FUNCTIONAL EFFECTS OF THE INVENTION

Since the hybrid prepreg according to the present invention is constituted as described above, the physical property such as the mechanical strength can be improved. Furthermore, it exhibits excellent compressive strength and elastic modulus with respect to the conventionl hybrid prepreg although the thickness according to the present invention is reduced. In particular, in the case where it is used in a golf shaft or the like, the satisfactory feel (shooting feeling) at the time of use and excellent impact resistance can be realized while maintaining the excellent mechanical strength and the shooting range. Furthermore, satisfactory appearance was displayed. In addition, according to the manufacturing method of the present invention, the lengthwise directional disorder of the configuration of the carbon fibers, the boron fibers and the different fibers can be prevented. Therefore, an advantage can be obtained in that a hybrid prepreg exhibiting excellent mechanical property and appearance can be provided.

What is claimed is:

1. A method of manufacturing a hybrid prepreg which comprises the steps of:

(a) winding a unidirectional fiber reinforced prepreg, in which reinforcing fibers each having a diameter of 5–30 μm are used, around the periphery of a drum having a fixed diameter so that the arrangement direction of the reinforcing fibers are oriented in the circumferential direction of the drum;

(b) winding, at fixed pitches, foreign fibers each having a diameter of 50–500 μm which differ from said reinforcing fibers of said prepreg, around the periphery of said unidirectional fiber reinforced prepreg which has already been wound around said drum; and (c) while the prepreg is wound around said drum or after the prepreg is removed from said drum, laying, further, a second unidirectional fiber reinforced prepreg, in which reinforcing fibers each having a diameter of 5–30 μm are used, over the surface of the unidirectional fiber reinforced prepreg on which said foreign fibers are disposed, in such a manner that the arrangement direction of the reinforcing fibers of said second unidirectional fiber reinforced prepreg is oriented in the circumferential direction of said drum.

2. A method of manufacturing a hybrid prepreg according to claim 1, wherein said reinforcing fiber is one or a plurality of fibers selected from an inorganic fiber such as a carbon fiber, a boron fiber, a glass fiber, an alumina fiber, a silicon carbide fiber and a silicon nitride fiber; an organic fiber such as an aramid fiber, a polyarylate fiber and a polyethylene fiber; and a metal fiber such as a titanium fiber, an amorphous fiber and a stainless steel fiber, and said foreign fiber is one or a plurality of fibers selected from an inorganic fiber such as a boron fiber, a glass fiber, an alumina fiber, a silicon carbide fiber and a silicon nitride fiber; an organic fiber such as an aramid fiber, a polyarylate fiber and a polyethylene fiber; and a metal fiber such as a titanium fiber, an amorphous fiber and a stainless steel fiber.

3. A method of manufacturing a hybrid prepreg according to claim 1, wherein said reinforcing fibers are carbon fibers, and said foreign fibers are composed of boron fibers and one or a plurality of fibers which are different from said boron fibers and said carbon fibers.

4. A method of manufacturing a hybrid prepreg according to claim 1, wherein said reinforcing fibers are carbon fibers, and said foreign fibers are composed of metal fibers and one or a plurality of fibers which are different from said metal fibers and said carbon fibers.

5. A method of manufacturing a hybrid prepreg according to claim 1, wherein said reinforcing fibers are carbon fibers, and said foreign fibers are composed of organic fibers and inorganic fibers.

6. A method of manufacturing a hybrid prepreg according to claim 1, wherein said reinforcing fibers are composed of carbon fibers arranged on one side of the prepreg and in one direction, and glass fibers arranged on the other side of the prepreg and in the same direction as the direction of said carbon fiber, and said foreign fibers are composed of boron fibers and one or a plurality of fibers which are different from said boron fibers, said carbon fibers and said glass fibers.

7. A method of manufacturing a hybrid prepreg according to claim 1, wherein said reinforcing fibers are composed of carbon fibers arranged on one side of the prepreg and in one direction, and glass fibers arranged on the other side of the prepreg and in the same direction as the direction of said carbon fibers, and said foreign fibers are composed of metal fibers and one or a plurality of different fibers which are from said metal fibers, said carbon fibers and said glass fibers.

8. A method of manufacturing a hybrid prepreg according to claim 1, wherein said reinforcing fibers are composed of carbon fibers arranged on one side of the prepreg and in one direction, and glass fibers arranged on the other side of the prepreg and in the same direction as the direction of said carbon fibers, and said foreign fibers are composed of organic fibers and glass fibers.

* * * * *